United States Patent
Wheeler et al.

(10) Patent No.: US 10,081,335 B1
(45) Date of Patent: Sep. 25, 2018

(54) AUTOMOTIVE RAIN DETECTOR USING PSYCHO-ACOUSTIC METRICS

(71) Applicant: FORD GLOBAL TECHNOLOGIES, LLC, Dearborn, MI (US)

(72) Inventors: Joshua R. Wheeler, Trenton, MI (US); Scott A. Amman, Milford, MI (US); Christoph Arndt, Moerlen (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/665,738

(22) Filed: Aug. 1, 2017

(51) Int. Cl.
*B60S 1/08* (2006.01)
*B60R 11/00* (2006.01)

(52) U.S. Cl.
CPC ........... *B60S 1/0822* (2013.01); *B60S 1/0859* (2013.01); *B60S 1/0881* (2013.01); *B60R 2011/0026* (2013.01); *G06T 2207/30252* (2013.01)

(58) Field of Classification Search
CPC . B60W 40/08; B60W 2040/0818; A61B 5/18; A61B 5/7275; A61B 5/1176; A61B 5/024; A61B 5/163; A61B 5/1172; B60S 1/0822; B60S 1/0881; B60S 1/0859; G06T 2207/30252; B60R 2011/0026
See application file for complete search history.

(56) References Cited

U.S. PATENT DOCUMENTS

| | | | |
|---|---|---|---|
| 4,527,105 A | 7/1985 | Shiraishi | |
| 4,652,745 A | 3/1987 | Zanardelli | |
| 7,475,587 B2 | 1/2009 | Kithil et al. | |
| 9,322,952 B2 | 4/2016 | Niemann et al. | |
| 9,422,055 B1* | 8/2016 | Beckman | B64C 39/024 |
| 2005/0016275 A1* | 1/2005 | Pankey | B60S 1/0818 73/579 |
| 2009/0304205 A1* | 12/2009 | Hardacker | H03G 3/301 381/104 |

FOREIGN PATENT DOCUMENTS

| | | |
|---|---|---|
| DE | 102007002257 A1 | 7/2008 |
| JP | 201568643 A | 4/2015 |

(Continued)

OTHER PUBLICATIONS

Shantanu Dharmadhikar, Naeem Tamboli, Nilesh Gawali, Prof. N.N. Lokhande, Automatic Wiper System, ISSN 2249-6343, International Journal of Computer Technology and Electronics Engineering (IJCTEE) vol. 4, Issue 2, Apr. 2014 (An ISO 9001: 2008 Certified International Journal), pp. 15-18.

(Continued)

*Primary Examiner* — Brian Wilson
(74) *Attorney, Agent, or Firm* — Frank A. MacKenzie; MacMillan, Sobanski & Todd, LLC

(57) ABSTRACT

An automatic wiper control system for a vehicle window determines the presence of rainfall based on window vibrations. During a vehicle driving cycle, a controller measures the window vibrations with an accelerometer attached to the window. The controller calculates a psycho-acoustic metric based on the measured vibrations, wherein the metric can be comprised of Articulation Index, Sharpness, or Roughness. The calculated metric is compared to a threshold indicative of rain impacting the window. The wiper system is activated according to a result of the comparison.

9 Claims, 5 Drawing Sheets

(56) References Cited

FOREIGN PATENT DOCUMENTS

KR    10-20160050446    *  5/2016   ............... B60A 1/08
WO        03038426 A1     5/2003

OTHER PUBLICATIONS

Prajakta Chapakanade, Pooja Gangurde, Siddhesh Peje, D.R. Shende, Automatic Rain Operated Wiper and Dimmer for Vehicle, International Research Journal of Engineering and Technology (IRJET), vol. 03 Issue: 04, Apr. 2016, pp. 2376-2378.

Maria Antonietta Panza, A review of experimental techniques for NVH analysis on a commercial vehicle, ATI 2015-70 Conference of the ATI Engineering Association, Energy Procedia 82 (2015) 1017-1023, pp. 1017-1023.

* cited by examiner

AUTOMOTIVE RAIN DETECTOR USING PSYCHO-ACOUSTIC METRICS

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to detecting the presence of rainfall on a vehicle window for automatic activation of a wiper system, and, more specifically, to rain detection by mechanical sensing and digital processing of acoustic metrics of a sensed vibration signal.

Automatic windshield wiper control systems that adjust wiper operation/speed according to the presence of moisture or the intensity of rainfall on the windshield are known in the art. Such systems typically include an electronic control module that is connected to a wiper arm drive motor. The control module adjusts the operation and speed of the wiper arm drive motor in response to sensory input. Optical sensors are the most common choice for sensing moisture. Placement on a window (e.g., near the rear view mirror) allows a sensor to detect moisture based on changes of light reflection when water is present. However, moisture must be concentrated precisely within the small field of the optical sensor for it to work properly. Dirt or other substances on the windshield can sometimes be interpreted as moisture, falsely triggering the wipers. Moreover, the sensors are relatively expensive and are only useful in connection with rain detection. It would be desirable to improve rain detection performance, reduce sensor costs, shrink packaging size, and adopt a sensor technology that supports other types of functionality.

SUMMARY OF THE INVENTION

In one aspect of the invention, a rain detector for a vehicle window comprises an accelerometer mounted on the window to generate a vibration signal. A processor uses the vibration signal to calculate a predetermined psycho-acoustic metric. A discriminator compares the calculated psycho-acoustic metric to a threshold indicative of rain impacting the window.

By virtue of using a low-profile accelerometer on the windshield to pick up sound vibrations, it is possible to continuously monitor for various interior and exterior events. The windshield or other window acts as a baffle so that the accelerometer functions as a microphone. Digital signal processing is applied to the resulting sound to distinguish the character of rain hitting the windshield from other types of interior and exterior sounds the vehicle would encounter. Mass produced accelerometers can be obtained at very low cost, yet the resulting rain detection performance is robust and reliable. The devices have a small size which can easily be placed within a rear view mirror assembly or other convenient location. Rain falling on the windshield creates a very distinct sonic profile which can be used to detect a rainy condition. In addition, the vibratory signal may also be useful for detecting other events, such as a siren sound from an emergency vehicle.

DETAILED DESCRIPTION OF PREFERRED EMBODIMENTS

Figure 1:
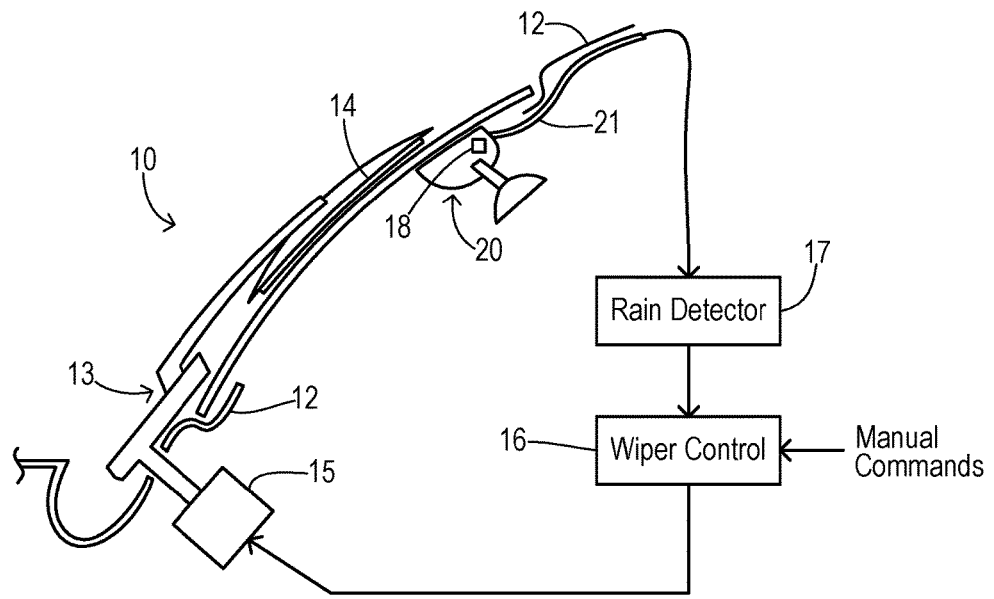
FIG. 1 is a system diagram of an automatic wiper system on a vehicle.

FIG. 1 shows a portion of a vehicle 10 including a windshield 11 retained on a vehicle body 12. A wiper arm 13 retaining a wiper blade 14 is rotationally coupled to a wiper motor 15. A wiper controller 16 activates motor 15 in response to manual commands from an operator controlled switch (not shown) or automatically in response to a rain detection signal from a rain detector 17. The invention utilizes a vibratory sensor 18 for characterizing vibrations of windshield 11 (or other vehicle window, including a rear window) which are analyzed by rain detector 17. In a preferred embodiment, sensor 18 comprises an accelerometer mounted directly to windshield 11 within a rearview mirror assembly 20. A wire bundle 21 for assembly 20 includes a wire for connecting sensor 18 to detector 17.

Figure 2:
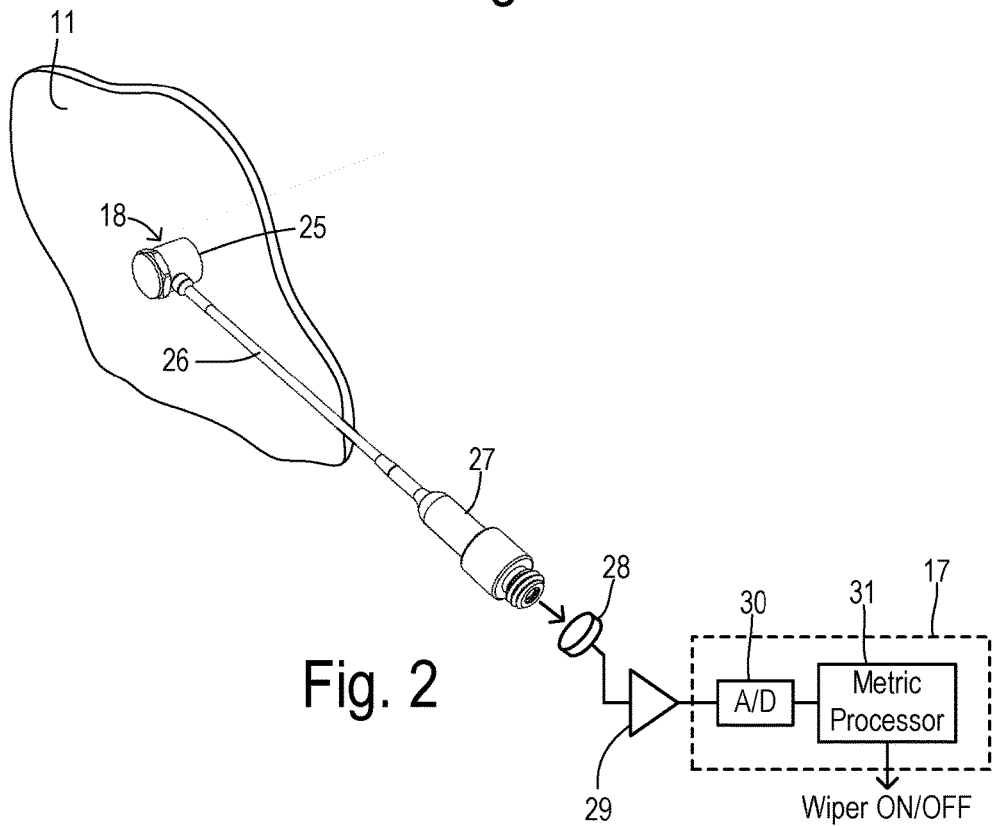
FIG. 2 shows an accelerometer mounted to a vehicle window and connected to electronic components for detecting rain.

FIG. 2 shows a preferred embodiment in greater detail. Sensor 18 includes an accelerometer 25 adhesively mounted to windshield 11. Accelerometer 25 may, for example, include a quartz shear element in a steel enclosure, such as a model 3032M9 accelerometer available from Dytran Instruments, Inc., of Chatsworth, Calif. A low profile and miniature size of accelerometer 25 is well adapted to fit within the footprint of a typical rearview mirror assembly for inconspicuous placement. Accelerometer 25 is oriented so that its sensing axis is perpendicular to the surface of windshield 11. A coaxial cable 26 conveys an accelerometer signal via connector plugs 27 and 28 (e.g., BNC connectors) to a signal conditioning circuit 29 (such as an amplifier). The conditioned accelerometer signal is provided to rain detector 17 which includes an analog-to-digital converter 30 and a metric processor 31.

Figure 3:
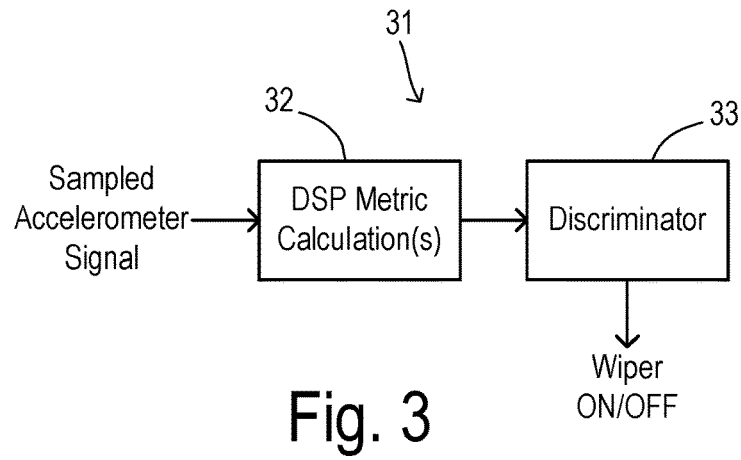
FIG. 3 is a block diagram showing electronic components of the invention in greater detail.

The physical act of water (e.g., rain) hitting the windshield "microphone" creates a particular sound profile. This invention has identified particular metrics through which this sound profile is distinguishable from other types of sounds. More specifically, the invention preferably employs known psycho-acoustic metrics such as Articulation Index, sharpness, and roughness, and for each metric identifies a corresponding threshold that clearly separates the sound of rain on the windshield from other interior and exterior noises that may be present. To support the function of an automatic wiper, the threshold establishes a trigger for activating the wiper system. As shown in FIG. 3, metric processor 31 can be configured to perform a digital signal processing (DSP) metric calculation 32, with the resulting psycho-acoustic metric being examined by a discriminator 33 which generates an automatic wiper On/Off command signal.

Figure 4:
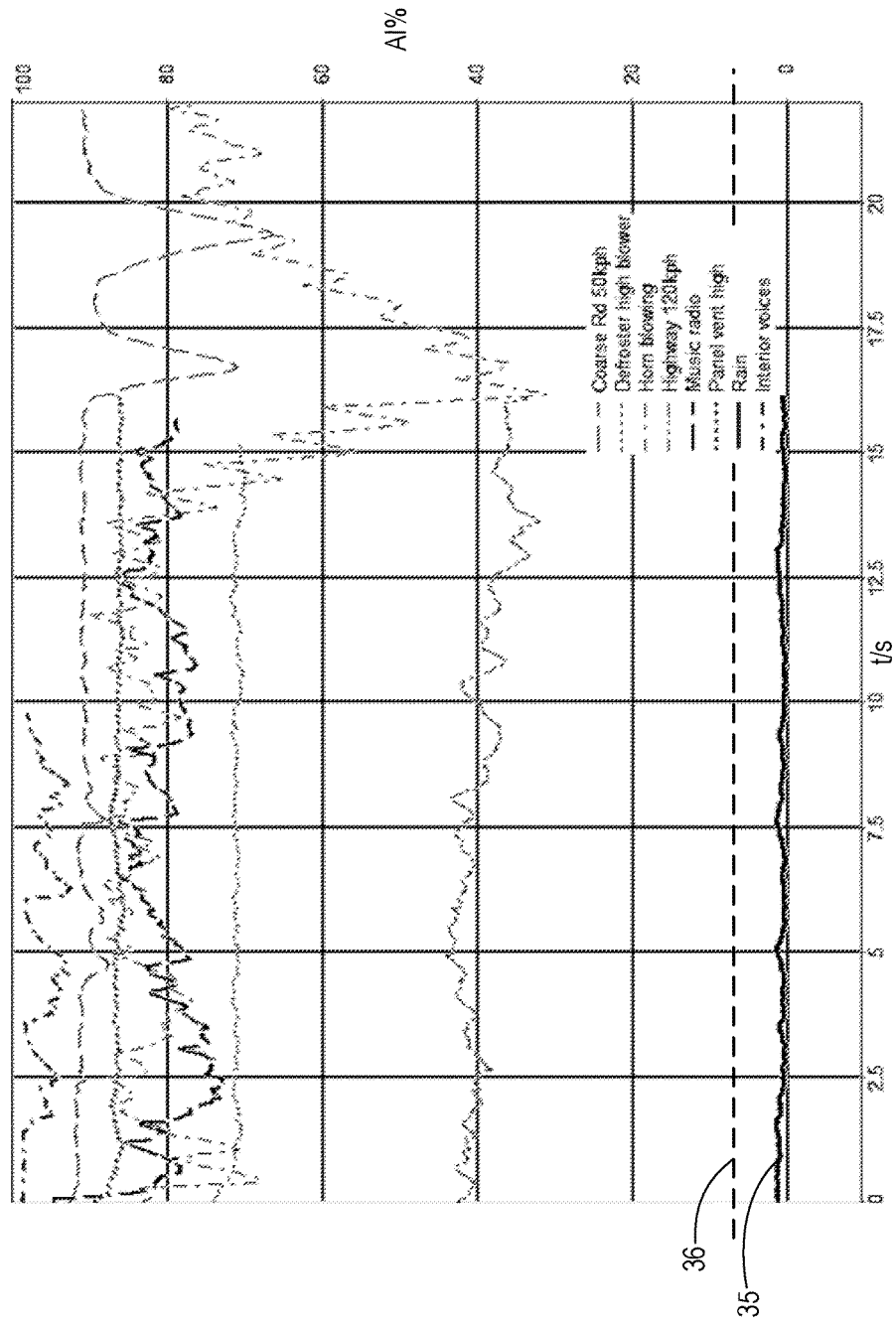
FIG. 4 is a graph showing an Articulation Index calculated for signals collected in the presence of rain and other vibratory disturbances.

A first embodiment of the psycho-acoustic metric shown in FIG. 4 is comprised of an Articulation Index. Articulation Index (AI) estimates the intelligibility of speech within a particular noisy environment or over a particular transmission channel. More specifically, it estimates a percentage of speech units that are perceived and understood by a listener. For calculating AI, signal-to-noise ratios (SNR) for several separate frequency bands are weighted and summed. In analyzing the AI of particular sounds where there is no speech signal for comparison, the SNR calculations are made against an idealized noise spectrum which is typically defined between 0 dB and 30 dB. Any signal which is 30 dB or greater than the idealized noise for a frequency band is set to 100%, and any signal which is 0 dB or less than the idealized noise is set to 0%. A commonly used algorithm for calculating AI uses about 5 bands of ⅓-octave between 200 Hz and 6300 Hz. DSP hardware and software packages are available for calculating AI % as well as sharpness, roughness, and other psycho-acoustic metrics useful in this invention, such as the ArtemiS Suite available from HEAD Acoustics GmbH of Herzogenrath, Germany.

FIG. 4 shows the results of analysis of data collected from an accelerometer mounted on a windshield of a vehicle that was subjected to many different conditions giving rise to corresponding vibrations or sounds of the windshield. For example, the vehicle was exposed to coarse road noise at low speed, high speed highway driving with large amounts of road and wind noise, HVAC operation with blower noise from defroster and panel vents, exterior noises from things like vehicle horns, interior noises (e.g., music) from an audio system, and conversations between passengers in the vehicle. Using sampled data corresponding to each condition obtained for a lengthy drive cycle, corresponding plots of the calculated AI values for each condition are shown in FIG. 4. The AI % value for rain impacting the windshield is shown as a solid trace 35, which remains near zero (e.g., less than about 2%) throughout the entire data collection period. In contrast, AI % values for all other test conditions shown by dashed traces are relatively higher. The lowest AI % values of the other conditions correspond to HVAC noises which go no lower than about 30%. Thus, a threshold 36 can be established somewhere between a few percent and about 25% which reliably differentiates between rain and all other sound sources. Preferably, threshold 36 may be about 5% to about 10%. Other definitions or calculation methods may also be used for AI % that allow negative results (i.e., less than 0%) or results greater than 100%, but the value of a corresponding threshold would be adjusted accordingly.

Figure 5:
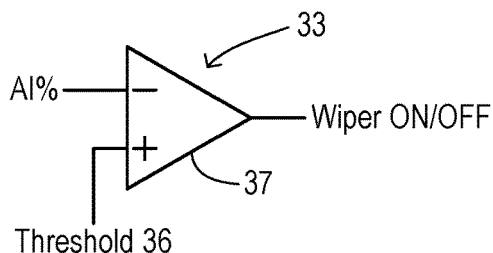
FIG. 5 is a discriminator for generating a wiper command signal based on a calculated Articulation Index.

FIG. 5 shows discriminator 33 having a configuration for comparing the calculated AI metric to threshold 36 using a comparator 37. The calculated value for AI % is coupled to an inverting input of comparator 37 and threshold 36 is coupled to a noninverting input. As long as there is no rainfall on the windshield, the value of AI % will be above threshold 36. Under those conditions, the comparatively higher level of AI % keeps the output of comparator 37 at a low logic level so that a rain detection signal which can be used as a wiper On/Off command signal keeps the wipers Off. In the presence of rainfall, the value of AI % drops below threshold 36 and the comparator output rises to a high logic level, which indicates detection of rain and activates the wipers.

Figure 6:
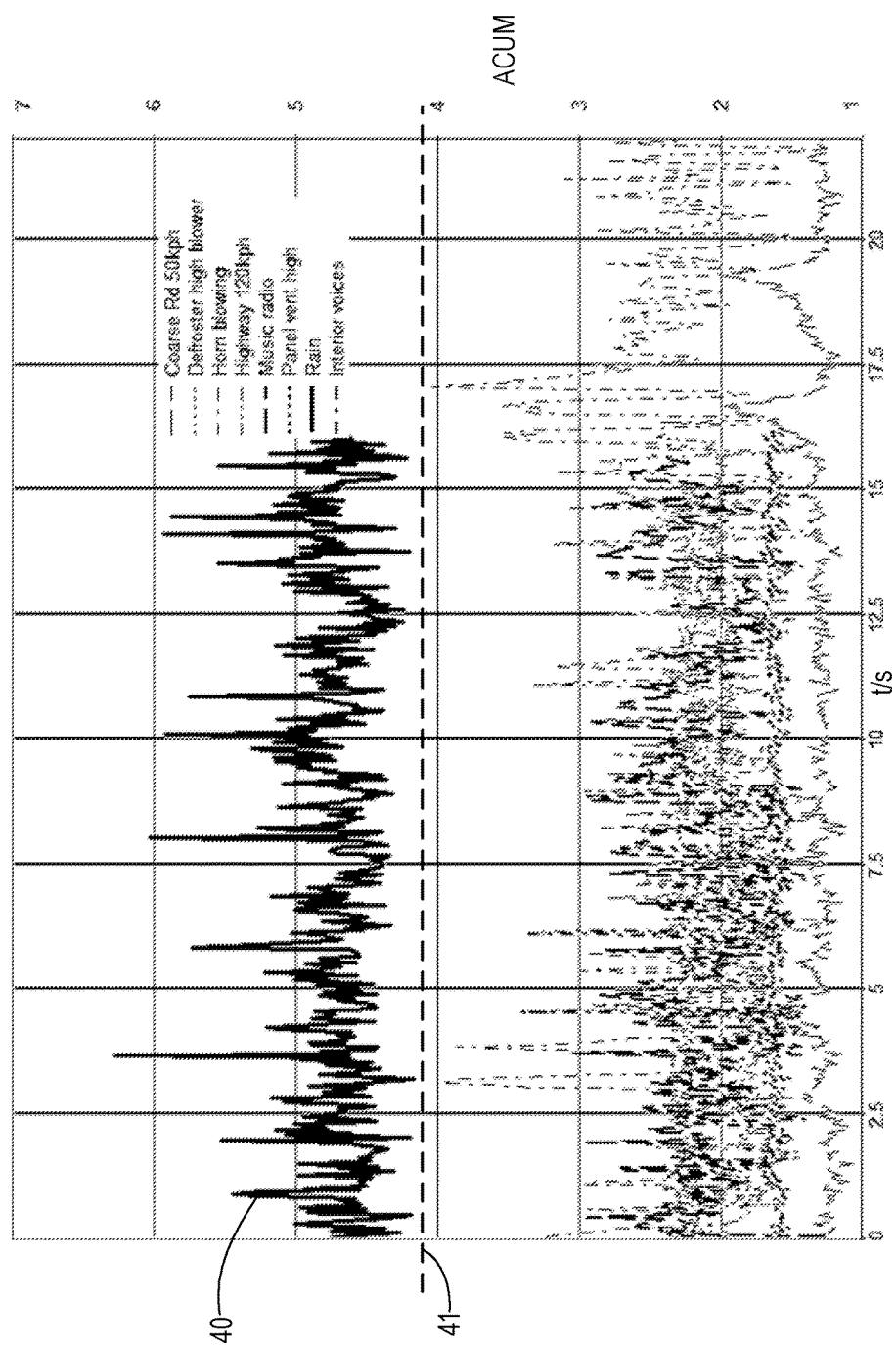
FIG. 6 is a graph showing a sharpness calculated for signals collected in the presence of rain and other vibratory disturbances.

A second embodiment of the psycho-acoustic metric shown in FIG. 6 is comprised of acoustic sharpness (S). Sharpness is a metric responsive to the frequency content of noise. It is proportional to the ratio of a high frequency noise level to an overall noise level. Sharpness has units of acum, and is preferably calculated according to the standard DIN-45692. For example, calculating S typically involves a sum or weighted partial moments of specific loudness, divided by total loudness. FIG. 6 shows a trace 40 for Sharpness S for windshield vibrations caused by rain, which has an average value around 4.8 acum and remains above 4.2 acum throughout. Calculated Sharpness S for all other sound sources remains below about 4.0 acum throughout. Thus, a Sharpness threshold 41 in a range of about 3.8 to about 4.3 acum can be used, with a most preferred threshold value of about 4.1 acum. To avoid false triggering at peaks or troughs of the calculated signals, time averaging prior to comparison with the threshold can be used.

Figure 7:
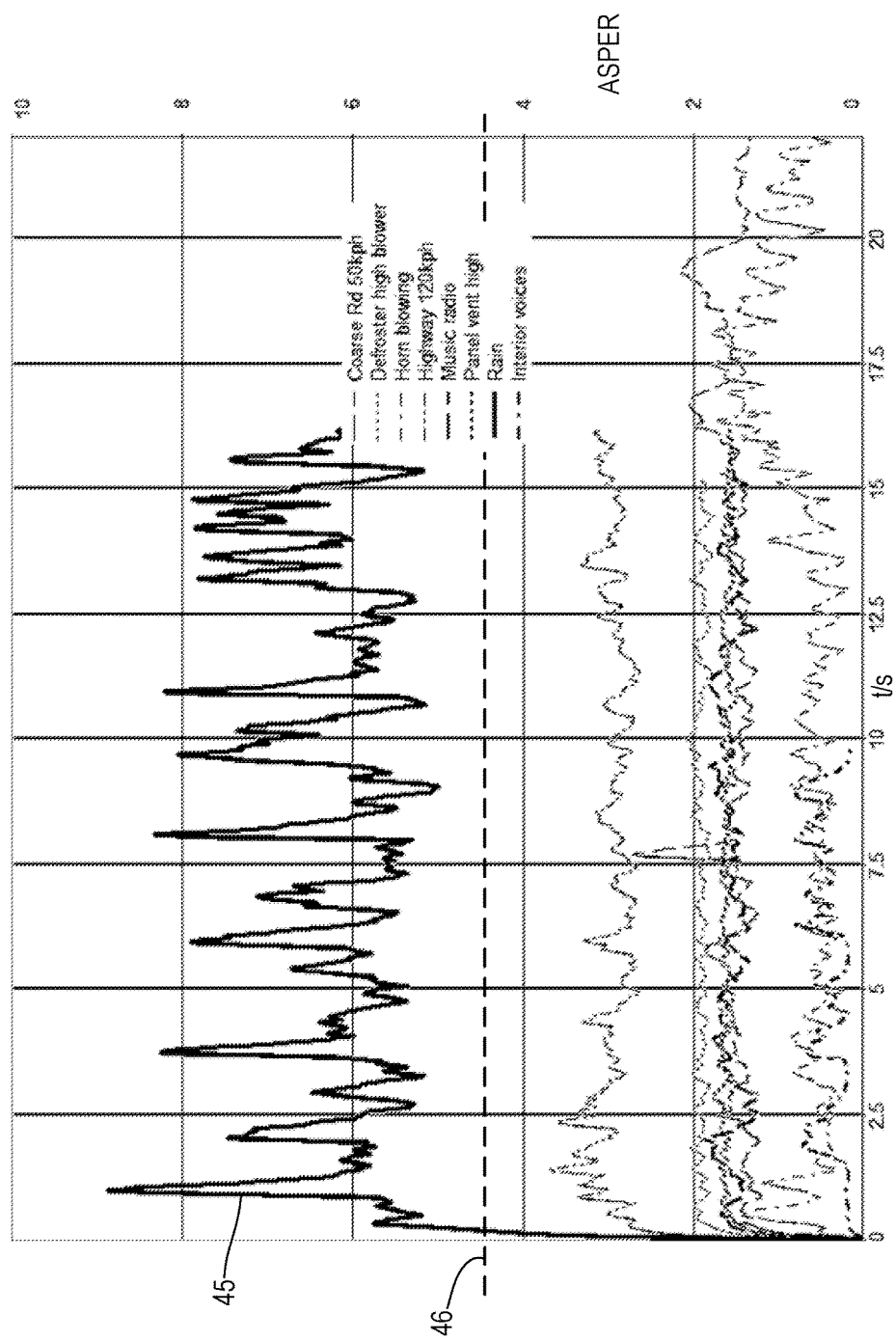
FIG. 7 is a graph showing a roughness calculated for signals collected in the presence of rain and other vibratory disturbances.

A third embodiment of the psycho-acoustic metric shown in FIG. 7 is comprised of acoustic roughness (R). Roughness is a metric that models response of the human ear to pulsations or beats that occur due to time-varying frequency content of sounds. It is calculated in the unit asper. A Roughness of 1 asper results when a sine tone of 1 kHz with a level of 60 dB is modulated at a frequency of 70 Hz. FIG. 7 shows a trace 45 for Roughness R for windshield vibrations caused by rain, which has an average value around 6 asper and remains above 5 asper throughout. Calculated Roughness R for all other sound sources remains below about 4 asper throughout. Thus, a Roughness threshold 46 in a range of about 4 to about 5.2 asper can be used, with a most preferred threshold value of about 5 asper.

Using any of the foregoing metrics, the invention includes a method of operating a wiper system for a vehicle window. During a vehicle driving cycle, a controller (such as a controller in a body control module) measures window vibrations with an accelerometer attached to the window. The controller calculates a psycho-acoustic metric based on the measured vibrations, wherein the metric can be comprised of Articulation Index, Sharpness, or Roughness. The calculated metric is compared to a threshold indicative of rain impacting the window. The wiper system is activated according to a result of the comparison.

Figure 8:
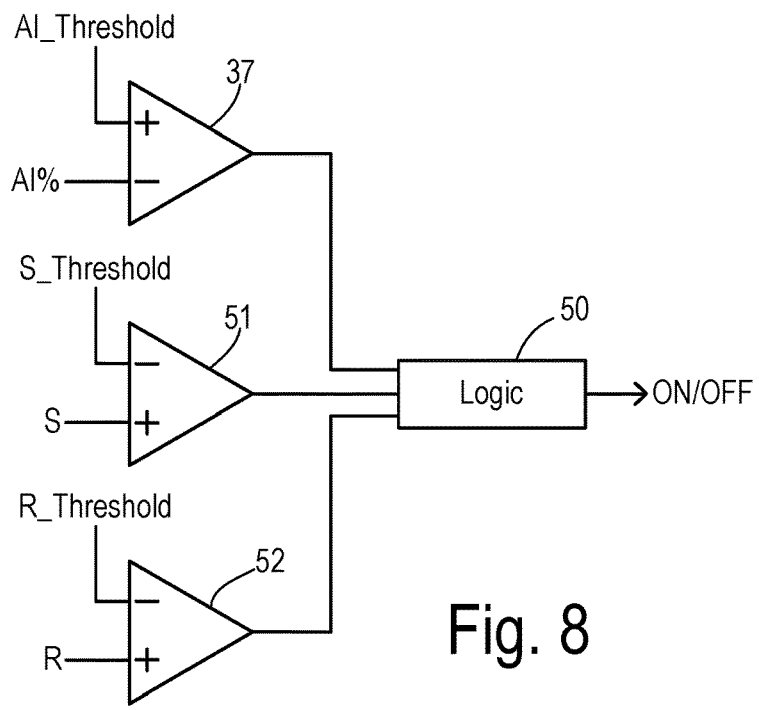
FIG. 8 is a block diagram showing another embodiment of a discriminator.

Rain detection can be based on using just one psycho-acoustic metric. Alternatively, metrics can be combined as shown in FIG. 8. Thus, the output of comparator 37 based on its comparison between calculated AI % and the AI threshold is coupled to one input of a logic block 50. Calculated Sharpness S is compared with a Sharpness threshold by a comparator 51 which provides a comparison result to logic block 50. Calculated Roughness R is compared with a Roughness threshold by a comparator 52 which provides a comparison result to logic block 50. Logic block may implement a voting scheme for generating a wiper On/Off command signal based on a predetermined number of the psycho-acoustic metrics indicating a detection of rainfall. The predetermined number could be set at one, two, or all three metrics indicating rain.

The foregoing description has shown rain detection using a robust and inexpensive transducer to trigger automatic windshield wiper operation. The detection covers the entire window glass, so that the water is not required to specifically hit the small optical sensor as in prior systems. The invention can be easily implemented on the rear back glass as well as front. The preferred high-volume accelerometers achieve significantly less cost than known optical sensors. In addition, the placement of an accelerometer on the glass can be useful for other functionalities such as emergency vehicle siren detection, railroad crossing signals, vehicle horns, or other sounds based on unique profiles of the detection of sound signals impinging on the windshield.

What is claimed is:

1. A rain detector for a vehicle window, comprising:
   an accelerometer mounted on the window to generate a vibration signal;
   a processor using the vibration signal to calculate a predetermined psycho-acoustic metric comprised of an articulation index; and
   a discriminator comparing the calculated psycho-acoustic metric to a threshold indicative of rain impacting the window, wherein the threshold is selected in a range of 5% to 10%.

2. The rain detector of claim 1 wherein the processor is comprised of a DSP audio processor.

3. The rain detector of claim 1 wherein the discriminator comprises a comparator.

4. An automotive wiper system for a vehicle window, comprising:
   a wiper assembly including a wiper motor driving a wiper arm;
   a wiper control selectably activating the wiper motor;
   an accelerometer mounted on the window to generate a vibration signal;
   a processor using the vibration signal to calculate a predetermined psycho-acoustic metric comprising at least one of the group consisting of an articulation index, a sharpness, and a roughness; and
   a discriminator comparing the calculated psycho-acoustic metric to a threshold indicative of rain impacting the window and providing a command signal to the wiper control for activating the wiper motor, wherein the threshold comprises at least one of the group consisting of an articulation index selected in a range of 5% to 10%, a sharpness selected in a range of 3.8 to 4.3 acum, and a roughness selected in a range of 4 to 5.2 asper.

5. The wiper system of claim 4 wherein the processor is comprised of a DSP audio processor.

6. The wiper system of claim 4 wherein the discriminator comprises a comparator.

7. A method of operating a wiper system for a vehicle window, comprising:
   measuring window vibrations with an accelerometer attached to the window;
   calculating a psycho-acoustic metric based on the measured vibrations;
   comparing the calculated psycho-acoustic metric to a threshold indicative of rain impacting the window; and
   activating the wiper system according to a result of the comparison;
   wherein the calculated psycho-acoustic metric comprises at least one of the group consisting of an articulation index, a sharpness, and a roughness; and
   wherein the threshold comprises at least one of the group consisting of an articulation index selected in a range of 5% to 10%, a sharpness selected in a range of 3.8 to 4.3 acum, and a roughness selected in a range of 4 to 5.2 asper.

8. A rain detector for a vehicle window, comprising:
   an accelerometer mounted on the window to generate a vibration signal;
   a processor using the vibration signal to calculate a predetermined psycho-acoustic metric comprised of sharpness; and
   a discriminator comparing the calculated psycho-acoustic metric to a threshold indicative of rain impacting the window, wherein the threshold is selected in a range of 3.8 to 4.3 acum.

9. A rain detector for a vehicle window, comprising:
   an accelerometer mounted on the window to generate a vibration signal;
   a processor using the vibration signal to calculate a predetermined psycho-acoustic metric comprised of roughness; and
   a discriminator comparing the calculated psycho-acoustic metric to a threshold indicative of rain impacting the window, wherein the threshold is selected in a range of 4 to 5.2 asper.

* * * * *